United States Patent [19]

Yamada et al.

[11] Patent Number: 4,932,427

[45] Date of Patent: Jun. 12, 1990

[54] APPARATUS FOR CONVEYING UNTREATED MATERIALS

[75] Inventors: Shizuhiro Yamada, Chiryu; Masakatsu Nambu, Nagoya, both of Japan

[73] Assignee: Yamada Mekki Kogyosho, Ltd., Nagoya, Japan

[21] Appl. No.: 254,656

[22] PCT Filed: Dec. 9, 1987

[86] PCT No.: PCT/JP87/00958

§ 371 Date: Sep. 26, 1988

§ 102(e) Date: Sep. 26, 1988

[87] PCT Pub. No.: WO88/04642

PCT Pub. Date: Jun. 30, 1988

[30] Foreign Application Priority Data

Dec. 15, 1986 [JP] Japan .................................. 61-298468
Jul. 24, 1987 [JP] Japan .................................. 62-185987

[51] Int. Cl.$^5$ .......................... B08B 3/04; B08B 13/00
[52] U.S. Cl. ..................................... 134/66; 118/423; 134/76; 198/465.4
[58] Field of Search ................. 134/66, 76; 198/465.4, 198/466.1; 118/423

[56] References Cited

U.S. PATENT DOCUMENTS 2,789,569 4/1957 Davis ................................ 134/76 X
2,792,809 5/1957 Cahn .................................... 118/423
2,928,401 3/1960 Finston ............................. 134/76 X
3,612,297 10/1971 Lapostolet ........................ 134/76 X Primary Examiner—Philip R. Coe
Attorney, Agent, or Firm—Foley & Lardner, Schwartz, Jeffery, Schwaab, Mack, Blumenthal & Evans

[57] ABSTRACT

An apparatus for conveying untreated materials includes a unit conveyor (25), and a collective conveyor (33). The unit conveyor (25) is constituted of a carriage (19) operated so as to move along a treatment line (1) composed of a plurality of treatment vessels arranged in a row, and carriers (16) provided so that they are moved vertically by the carriage (19) so as to lift and lower from and into the interior of a treatment vessel, while the collective conveyor (33) is constituted of elevator frames (26) provided along the treatment line (1) within the zone of movement of the carriage (19), lifting gears (27) adapted to move the elevator frames (26) in the vertical direction, and supports (28) which are provided on the elevator frames (26) respectively so as to be moved in the direction of the treatment line (1) and which are adapted to support the untreated materials (15). The unit conveyor (25) is adapted to convey the untreated materials (15) placed in a single treatment vessel collectively to another arbitrary treatment vessel, and the collective conveyor (33) to convey the materials (15) placed in a plurality of treatment vessels collectively to a plurality of subsequent treatment vessels.

5 Claims, 11 Drawing Sheets

| TREATING TUB NUMBER | — | 2 | 3 | 4 | 5 | 6 | 7 | 8 | 9 | 10 | 11 | 12 | 13 | 14 | — | — | — |
|---|---|---|---|---|---|---|---|---|---|---|---|---|---|---|---|---|---|
| TREATING STEP | LOAD | ELECTROLYTIC DEGREASING (10") | WATER WASHING (15") | WATER WASHING (15") | WATER WASHING (15") | ACID PICKLING (15") | WATER WASHING (15") | WATER WASHING (15") | SOFT ETCHING (15") | WATER SPRAY WASHING (15") | WATER SPRAY WASHING (15") | ACID PICKLING (15") | WATER WASHING (15") | WATER WASHING (15") | ELECTROPLATING | WATER WASHING (30") | UNLOAD |
FIG. 7
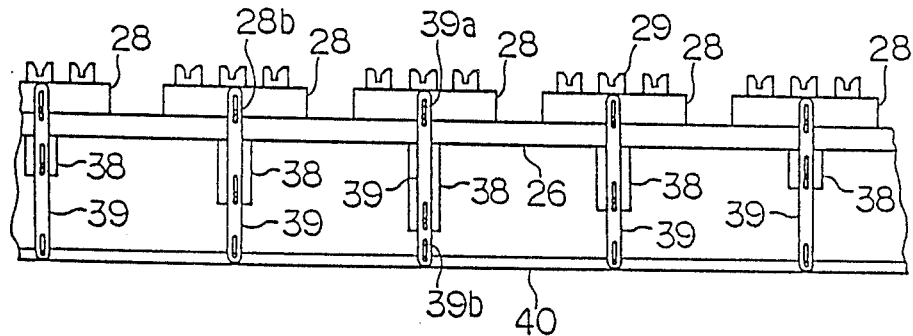
FIG. 8
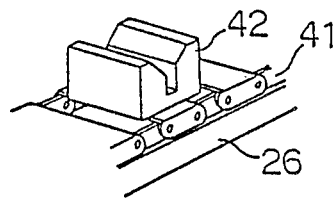
FIG. 9

| TREATING TUB NO. | — | 2A | 3A | 4A | 5A | 6A | 7A | 8A | 9A | 10A | 11A | 12A | 13A | 14A |
|---|---|---|---|---|---|---|---|---|---|---|---|---|---|---|
| TREATING TUB NO. | LOAD | ELECTROLYTIC DEGREASING | WATER WASHING | WATER WASHING | ACID PICKLING | WATER WASHING | WATER WASHING | SOFT ETCHING | WATER SPRAY WASHING | WATER SPRAY WASHING | ACID PICKLING | WATER WASHING | WATER WASHING | ELECTROPLATING |
| | | (30') | (15') | (15') | (30') | (15') | (15') | (30') | (15') | (15') | (30') | (15') | (15') | |

APPARATUS FOR CONVEYING UNTREATED MATERIALS

BACKGROUND OF THE INVENTION

1. Field of the Invention

The present invention relates to an apparatus for conveying untreated materials, wherein the untreated materials are conveyed from a treating section to another in an electroplating system, a painting system or the like including a row of treating sections into which the untreated materials are conveyed in turn to be treated in a given treating manner.

2. Description of the Prior Art

Apparatus of the above-mentioned type have been used, for example, to convey materials or workpieces to be electroplated in turn in electroplating workshops. As well known, the electroplating treatment includes many treating steps performed in sequence. Accordingly, the materials to be electroplated are conveyed by a conveying apparatus from each treating section to another in turn. Such conveying apparatus of the elevator type is known. In the elevator type conveying apparatus, the materials are hung on carrier bars bridged over opposite edges of treating tubs and lowered into the treating tubs. A pair of elevator frames are provided on opposite sides of the treating tubs along the treatment line. The elevator frames are movable vertically, and when moved upwardly, the elevator frames are adapted to lift both ends of each carrier bar, thereby carrying the materials out of the treating tubs. A part of each elevator frame supporting the carrier bars is movable transversely (or along the treatment line) and moved transversely with the materials carried out of the treating tubs so that the materials are conveyed to areas over the subsequent treating tubs, thereby lowering the materials into the treating tubs.

According to the above-described elevator type apparatus, when the elevator frames are operated at one operation cycle of upward, transverse, and downward movements, all the materials placed in the zone of movement of the elevator frames are collectively conveyed. Therefore, the elevator type conveying apparatus has a high conveyance efficiency and is suitable for mass production of a few kinds of workpieces. The elevator type conveying apparatus, however, has the following disadvantages. First, since a feed pitch of each elevator frame is constant at any position, the treating tub for treatment requiring a long period of time is necessarily rendered large-sized in proportion to the treating period, resulting in a large-scaled treatment line. For example, when the electrolytic degreasing, acid pickling, and electroplating require 10 seconds, 20 seconds, and 10 minutes (600 seconds), respectively, the length of the acid pickling tub in the direction that the materials are conveyed takes the value of 1 meter, and that of the electroplating tub the value of 30 meters when that of the electrolytic degreasing tub takes the value of 50 centimeters. Secondly, it is rather difficult to omit or skip over a part of the treating steps depending on the materials to be treated. Even if some of the treating steps can be omitted or skipped over, the production period of time cannot be shortened since the materials are conveyed at a given pitch.

On the other hand, a carrier type conveying apparatus, which is quite different from the foregoing elevator type, has been commercially produced. Travelling rails are provided over the treatment line, and a carrier is movable along the rails to any position. The carrier is moved from one treating tub to an area over a next treating tub with the materials hung on the carrier, thereby lowering them into the treating tub.

According to the carrier type conveying apparatus, the materials may be conveyed to and placed in any treating tub :or any period of time. As a result, a plurality of kinds of materials having different treating steps may be conveyed. Furthermore, the length of the treatment line may be shortened. However, since a unit of materials need to be always conveyed, the conveyance efficiency is reduced, resulting in reduction of the productivity thereof.

As described above, the conventional elevator type conveying apparatus causes the treatment line to become large-scaled, while it is superior in the conveyance efficiency. Furthermore, it has a disadvantage of lacking adaptability in combination of the treating steps.

Although the carrier type conveying apparatus is superior in the shortening of the treatment line and the adaptability in combination of the treating steps, it is inferior in the conveyance efficiency.

SUMMARY OF THE INVENTION

Therefore, a primary object of the present invention is to provide an apparatus for conveying untreated materials, which has an eminent conveyance efficiency and which is capable of shortening the treatment line, and wherein the combination of the treating steps may be changed with ease.

A second object of the present invention is to provide an apparatus for conveying untreated materials, wherein the treating period of time may be shortened.

In order to achieve the primary object, the apparatus for conveying untreated materials in accordance with a first aspect of this invention comprises a unit conveyor means movably provided along a treatment line including a plurality of treating sections arranged in a row, the unit conveyor means being moved from one of the treating sections to another so that a unit of untreated materials is lifted and lowered from and into the treating section, and a collective conveyor means movably provided along the treatment line, the collective conveyor means being moved so that the untreated materials located at a plurality of treating sections are collectively lifted from said plurality of treating sections and lowered into a plurality of subsequent treating sections, the collective conveyor means having a zone of movement thereof overlapped with a zone of movement of the unit conveyor means over a plurality of treating sections along the treatment line.

According to the above-described conveying apparatus, the unit or collective conveyor means may be selected in the area in which the movement zones of the unit and collective conveyor means are overlapped, in accordance with treating steps to be required. For example, when one or more of the predetermined treating steps are to be omitted or skipped over, the materials are conveyed by the unit conveyor means with the treating sections corresponding to the treating steps to be skipped over passed. When the treating steps are not to be skipped over, the materials are efficiently conveyed by the collective conveyor means.

In order to achieve the second object, the apparatus for conveying untreated materials in accordance with a second aspect of this invention comprises a collective conveyor means for conveying untreated materials along a treatment line including a plurality of treating sections arranged in a row, the treating sections including a plurality of water washing sections continuously disposed, the collective conveyor means reiterating an operation cycle of (A) lifting the untreated materials placed in the treating sections, the untreated materials being supported by support members, (B) conveying the untreated materials along the treatment line, and (0) lowering the untreated materials into subsequent treating sections, thereby returning to an initial position thereof, one of the support members corresponding to the treating sections except the water washing sections being reciprocally moved between a support position at which the untreated materials are supported and a support evasion position at which the untreated materials are not supported so that the position of the support members is changed at every one cycle of the collective conveyor means.

According to the apparatus in accordance with the second aspect of the invention, when the collective conveyor means is operated with the support members set at the support position, all the untreated materials located at all the treating sections are conveyed by one pitch to thereby feed the untreated materials to the respective next treating sections. When the collective conveyor means is operated with the support members set at the support evasion position, only the untreated materials located at the water washing sections are conveyed to the respective next treating sections, and the untreated materials located at the other treating sections are not conveyed. Consequently, the time period required for the water washing may be shortened as compared with the period of the other treating operations.

BRIEF DESCRIPTION OF THE DRAWINGS

In the accompanying drawings:

FIG. 7 shows relationship between the treating steps and the conveyance system in the first embodiment;

FIG. 8 is a view similar to FIG. 4 showing a modified form of the collective conveyor means as a second embodiment of the present invention;

FIG. 9 is a partial perspective view of a further modified form of the collective conveyor means as a third embodiment;

DESCRIPTION OF THE PREFERRED EMBODIMENTS

Figure 1:
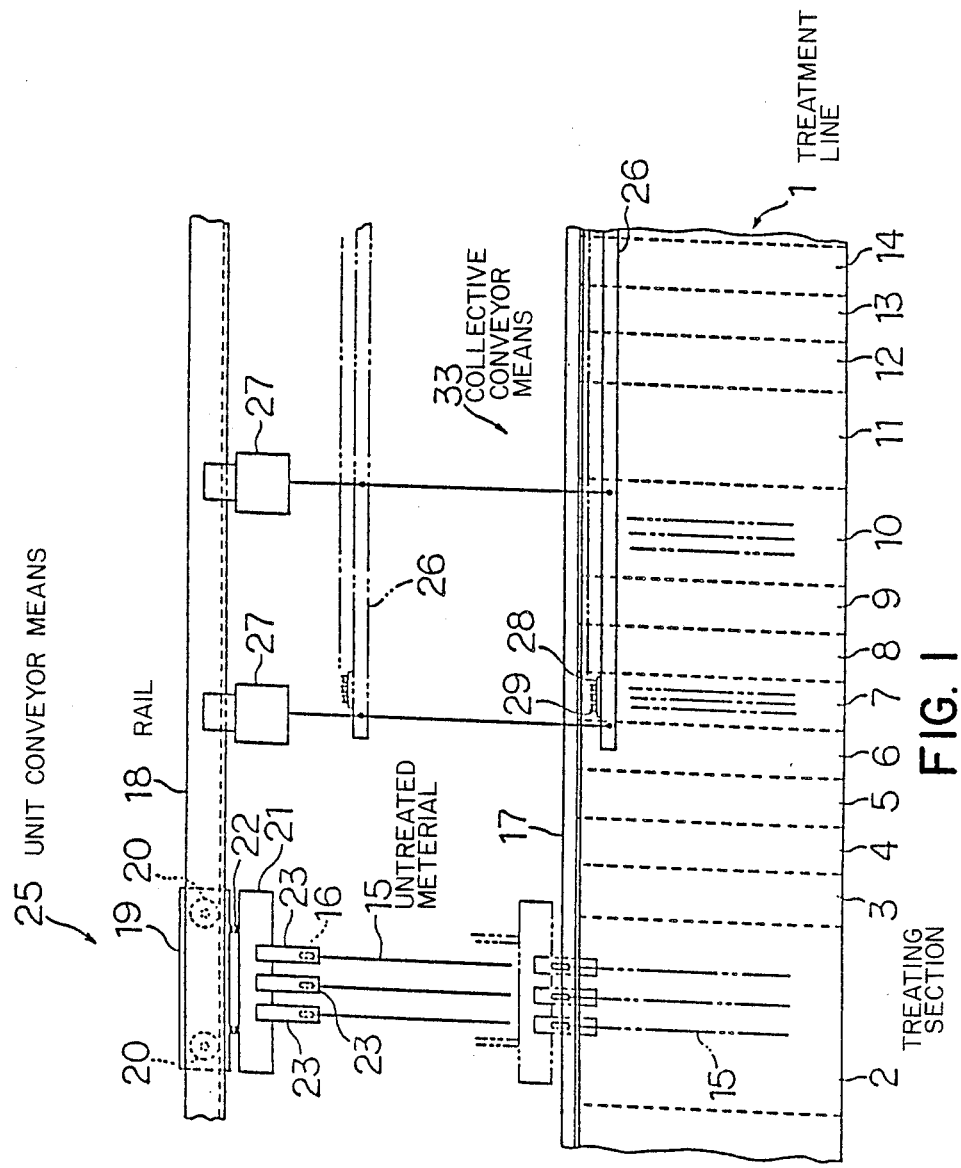
FIG. 1 is a partial side view of the treatment line employed in a first embodiment of the present invention.
Figure 2:
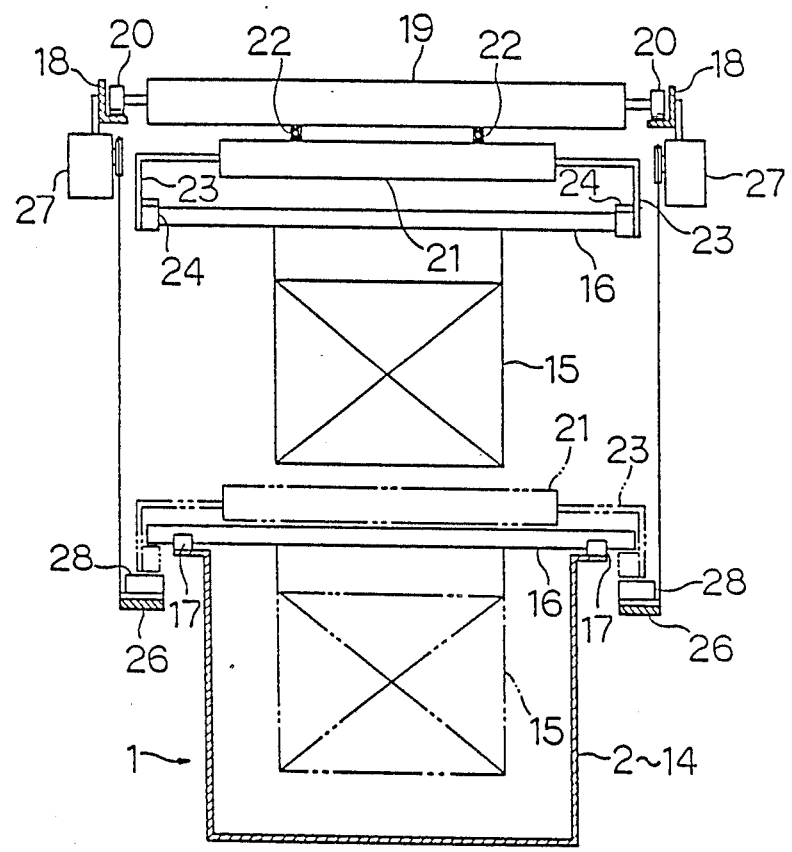
FIG. 2 is a longitudinal section of the treatment line shown in FIG. 1.

In the following description of the embodiments, the apparatus for conveying untreated materials in accordance with the present invention is applied to a conveyor for conveying materials to be electroplated in an electroplating workshop. A first embodiment will now be described with reference to FIGS. 1-7 of the drawings. FIG. 1 shows a part of a treatment line 1 employed in the embodiment. Reference numerals 2-14 indicate treating tubs as treating sections. These treating tubs are employed for, in turn, the electrolytic degreasing, water washing, water washing, water washing, acid pickling, water washing, water washing, soft etching, water spray washing, water spray washing, acid pickling, water washing, and water washing, respectively. Practically, further electroplating and water washing tubs (neither shown) follow the water washing tub 14. The treating tubs 2-14 constitute the treatment line 1 together with these tubs. Workpieces 15 to be electroplated, as untreated materials, are hung on carrier bars 16 bridged over opposite edges of a treating tub, as shown in FIG. 2. Both ends of each carrier bar 16 are received by grooves (not shown) of carrier bar insulators 17 extending along opposite sides of all the treating tubs so that the workpieces 15 are placed in the treating tub.

Figure 3:
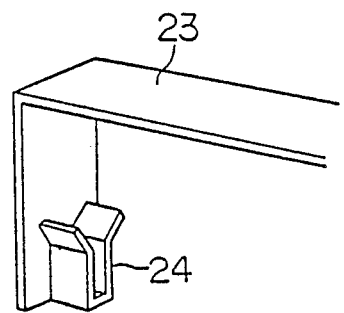
FIG. 3 is a perspective view of a hook arm.

Reference numeral 18 indicates a pair of rails extending along the treatment line 1 thereover. A carriage 19 is provided with wheels 20 rolling on the rails 18 and self-moving means (not shown) so that the carriage 19 is moved along the rails 18. A carrier elevator 21 is hung on the carriage 19 through chains 22. When drive means (not shown) disposed in the carriage 19 is operated, the carrier elevator 21 is moved between an upper limit position shown by solid line in FIG. 2 and a lower limit position shown by alternate long and two short dashes line in FIG. 2. The carrier elevator 21 may be vertically guided by a pair of guide rails provided on opposite sides of the carriage 19. Three pairs of hook arms 23, for example, are mounted on opposite sides of the carrier elevator 21. Carrier hooks 24 are provided on both inner sides of the lower end of each hook arm 23, as shown in FIG. 3. Lowering pitch changing means (not shown) is provided in the carrier elevator 21 so that a pitch among the hook arms 23 and hence, among the workpieces 15 may be changed. The carriage 19, carrier elevator 21, and their related mechanism constitute a unit conveyor means 25 in the present invention. In the condition that the carrier elevator 21 is at the lower limit position, the carriage 19 is moved to a position of a predetermined treating tub and subsequently, the carrier elevator 21 is moved up to the upper limit position, thereby both ends of each carrier bar 16 is hooked by the carrier hooks 24 to thereby lift a unit of workpieces 15, for example, three workpieces, out of the treating tub. Further in the above-mentioned condition, the carriage 19 is moved to be located over a next treating tub for execution of a next treating step. The carrier elevator 21 is then moved down to the lower limit position such that both ends of each carrier bar 16 is received by the grooves of the carrier bar insulators 17 to thereby position the workpieces 16 in the treating tub. A zone of movement of the unit conveyor means 25, that is, an area along which the rails 18 are extended covers a whole area of the treatment line 1.

Figure 4:
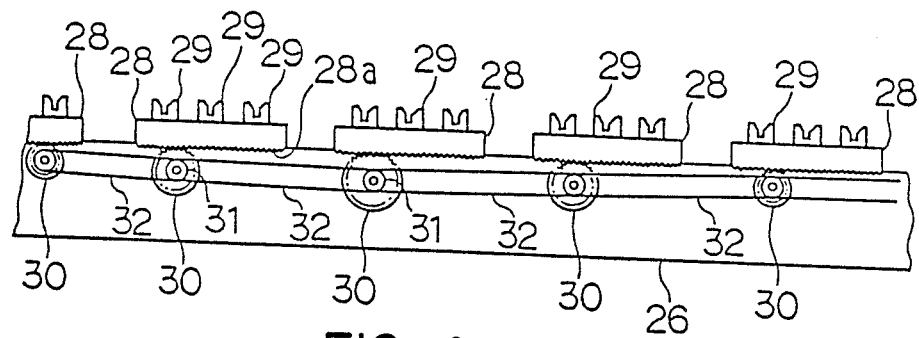
FIG. 4 is a partially enlarged side view of the collective conveyor means.

Referring to FIG. 1, elevator frames 26 are provided at both sides of predetermined treating tubs so as to be positioned outside the carrier bar insulators 17. The elevator frames 26 are moved by lifting gear means 27 provided outside the insulators 17 so as to be moved between a lower limit position shown by solid line and an upper limit position shown by alternate long and two short dashes line in FIG. 1. A plurality of slide blocks 28 are provided so as to be movable along the elevator frames 26. As shown in FIG. 4, each slide block 28 has, for example, three bar supports 29 formed on the upper face thereof and a rack 28a formed on the lower face thereof. Drive sprockets 30 are mounted on the elevator frames 26 so as to correspond to the slide blocks 28 and to be in mesh engagement with the racks 28a. The drive sprockets 30 are rotated by a predetermined angle to move the slide blocks 28 along the elevator frames 26. Each drive sprocket 30 is provided with two coaxial follower sprockets 31 (one of them is shown in FIG. 4). A chain 32 is provided between the follower sprockets 31. When drive force from a feed gear (not shown) is transmitted to one of the follower sprockets 31, the drive force is further transmitted to the other follower sprockets 31 through the chain 32, The elevator frames 26, slide blocks 28 drive sprockets 30, follower sprockets 31, chain 32, feed gear, and their related mechanism constitute a collective conveyor means 33 in the present invention. In the collective conveyor means 33, when the elevator frames 26 are moved upwardly from the lower limit position, both ends of all the carrier bars 16 located in the elevator frame moving area are hooked by the bar supports 29 of the slide blocks 28, thereby lifting the carrier bars 16 and hence the workpieces 15 all together. Subsequently, when the elevator frames 26 reach the upper limit position, the chain 32 is driven to thereby feed the slide blocks 28 and hence the workpieces 15 to the next treating step sides. The elevator frames 26 are then mowed to the lower limit position again, and the carrier bars 16 are received by the carrier bar insulators 17 to thereby position the workpieces 15 in the treating tubs. The zone of movement of the collective conveyor means 33, that is, the arrangement area along which the elevator frames 26 are moved covers an area from the treating tub 6 for a first acid pickling treatment to the treating tub 14 for water washing treatment immediately before the electroplating and an area from the water washing tub (not shown) after the electroplating to an unload position. FIG. 7 shows the movement zones of the unit and collective conveyor means 25 and 33 by way of arrows, respectively. The movement zones of the unit and collective conveyor means 25 and 33 are adapted to be overlapped in the section from the first acid pickling tub 6 to the water washing tub 14 and the section from the water washing tub after the electroplating treatment to the unload position.

As is shown in FIG. 4, the drive sprockets 30 mounted on the elevator frames 26 have three kinds of diameters. The drive sprocket with a smallest diameter is employed at the part of each elevator frame 26 corresponding to the section from the acid pickling tub 6 to the soft etching tub 9, in which section the materials 15 are fed by a distance approximately equal to one another. The drive sprockets 30 with an intermediate diameter are employed at the part of each elevator frame 26 corresponding to the section from the soft etching tub 9 to a first water spray washing tub 10 and the section from a second water spray washing tub 11 to the acid pickling tub 12. The drive sprocket with a largest diameter is employed at the part of each elevator frame 26 corresponding to the section from the water spray washing tub 10 to another water spray washing tub 12. Such an arrangement of the drive sprockets 30 allows the feed pitches of the materials 15 to agree with one another in accordance with the length of each treating tub.

Figure 5:
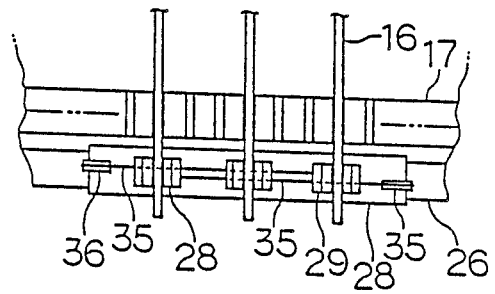
FIG. 5 is a plan view of a feed pitch changing means.
Figure 6:
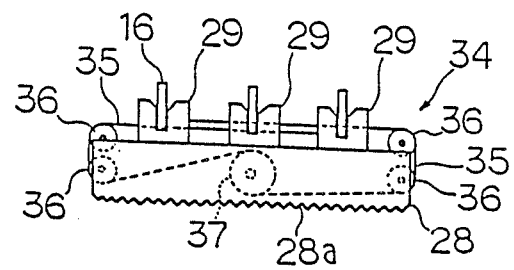
FIG. 6 is a side view of the feed pitch changing means.

Each slide block 28 is provided with an arrangement pitch changing means 34 as shown in FIGS. 5 and 6 and not shown in FIG. 1 nor 4. Of the bar supports 29 mounted on each slide block 28, each central one is secured to each slide block 28. The other two supports 29 positioned on both sides of the upper surface of each slide block 28 are movable along each slide block 28 and usually urged by springs (not shown) so as to depart from the central bar support. Reference numeral 35 indicates two flexible wires. One end of one of the flexible wires 35 extends through the left and central bar supports and is fixed to the right bar support, as seen in FIGS. 5 and 6. One end of the other flexible wire 35 extends through the right and central bar supports and is fixed to the left bar support, as seen in FIGS. 5 and 6. The other ends of the wires 35 are guided by guide pulleys 36 into the slide blocks 28, wherein the flexible wires 35 are taken up by a take-up drum 37. The take-up drum 37 is rotatably driven by an electric motor (not shown) so as to take up the flexible wires 35. Thus, when the flexible wires 35 are taken up by the take-up drum 37, the bar supports 29 positioned at both sides of each slide block 28 are moved so as to approach the central bar support 29. When the take-up drum 37 is reverse rotated, the outer bar supports 29 are moved so as to depart from the central bar support. The arrangement pitch changing means 34 is employed for increasing the arrangement pitch of the untreated materials 15 conveyed to the water spray washing tubs 10 and 11.

Operation of the apparatus of the first embodiment will now be described.

1. Execution of all the treating steps:

A column (A) of FIG. 7 shows the conveying system and the treating steps of the untreated materials 15. Each parenthesized numeral in a column of the treating steps in FIG. 7 indicates a treating period of time required for each treating step. Furthermore, in FIG. 7, each treatment to be executed is indicated by a small circle. Each section in which the untreated materials 15 are conveyed by the unit conveyor means 25 is indicated by broken line, and each section in which the untreated materials 15 are conveyed by the collective conveyor means 33 is indicated by solid line. The unit conveyor means 25 is loaded with the untreated materials 15 to be electroplated, and the materials 15 are first conveyed to the electrolytic degreasing tub 2. The untreated materials 15 in every one treating step are sequentially conveyed by the unit conveyor means 25 to the acid pickling tub 6. Subsequently, the untreated materials 15 in every one treating step are sequentially conveyed from the acid pickling tub 6 to the water washing tub 14 before the electroplating step by the collective conveyor means 33. The materials 15 are loaded again on the unit conveyor means 25 and passed to the electroplating tub. Subsequently, the materials 15 are conveyed by the collective conveyor means 33 from the water washing tub after the electroplating step to the unload position.

2. The case where the electrolytic degreasing treatment is not executed:

Some materials 15 to be electroplated are not suitable for the electrolytic degreasing. A column (B) of FIG. 7 shows the conveyance system for such materials 15. The materials 15 loaded on the unit conveyor means 25 passes the electrolytic degreasing tub 2 and water washing tubs 3-5 and are conveyed to the acid pickling tub 6. Subsequently, the materials 15 are conveyed to the unload position by the collective conveyor means 33 in the same manner as above described in paragraph 1.

3. The case where the first acid pickling and soft etching treatments are not executed:

A column (C) of FIG. 7 shows the conveyance system of this case. The materials 15 to be electroplated which are loaded on the unit conveyor means 25 are conveyed to the electrolytic degreasing tub 2 and water washing tubs 3-5 in turn. Subsequently, the unit conveyor means 25 loaded with the materials 15 passes the tubs 6-11 from the first acid pickling step to the second water spray washing step. Then, the collective conveyor means 33 conveys the materials 15 from the acid pickling tub 12 to the water washing tubs 13 and 14. The materials 15 are then conveyed to the electroplating tub by the unit conveyor means 25 and then conveyed to the water washing tub and the unload position by the collective conveyor means 33.

According to the apparatus of the first embodiment, parts of the movement zones of the unit and collective conveyor means 25 and 33 are overlapped on the treatment line 1, as is obvious from the description of operation of the apparatus. Consequently, the materials 15 may be conveyed reasonably both where all the treating steps are executed in turn and where some of the treating steps are skipped over or omitted. Furthermore, since the combination of the treating steps has adaptability, different kinds of materials 15 requiring different combinations of treating steps may be conveyed along the treatment line 1. Accordingly, the apparatus of the first embodiment is suitable for production of a small quantity of many kinds of products. Moreover, since the materials 15 are conveyed on the collective conveyor means 33 in the electroplating treatment which requires much time, the electroplating tub need not be rendered large-scaled in accordance with the electroplating period of time, thereby shortening the treatment line 1.

Although the section where parts of the movement zones of the unit and collective conveyor means 25 and 33 are overlapped extends over a plurality of treating tubs, the overlapped parts may extend over only one treating tub depending on the construction of the treatment line 1. Further, although the unit conveyor means 25 conveys the materials 15 with three carrier bars 16 as a unit, the number of carrier bars 16 is not limited to three. One or more carrier bars 16 may be employed. Additionally, although the drive sprockets 30 having diameters different from one another are employed in the above-described embodiment so that the collective conveyor means 33 has different feed pitches in some positions, the collective conveyor means 33 may be constructed as is shown in FIG. 8 as a second embodiment which will hereinafter be described.

Referring now to FIG. 8 illustrating a modified form of the collective conveyor means 33, support plates 38 are secured to the underside of each elevator frame 26 so as to correspond to the respective slide blocks 28. Drive levers 39 are rotatably mounted on the support plates 38, respectively. The upper end of each drive lever 39 is coupled to each pin 28b projected on each slide block 28 through each elongated slit 39a. The lower end of each drive lever 39 is coupled to a drive shaft 40 provided along the elevator frames 26 through each elongated slit 39b. Supporting points on which the drive levers 39 are supported on the support plate 38 having vertically different positions from one another depending on the feed pitches required. The drive shaft 40 is reciprocally moved in the horizontal direction, for example, by cylinder means (not shown), thereby moving each slide block 28 by a distance depending on the position of the supporting point of each drive lever 39. The above-described construction permits the collective conveyor means 33 to have different feed pitches, as in the first embodiment.

FIG. 9 shows a third embodiment of the invention. In the case where the feed pitches of the collective conveyor means 33 need not be different from one another at positions, a large number of bar supports 42 are secured to the chain 41 extending over each elevator frame 26, and the chain 41 is moved by a predetermined momentum. Alternatively, when the feed pitch of the collective conveyor means 33 thus takes a predetermined value, the bar supports 42 may be integrated with the respective elevator frames 26. In such a construction, when the elevator frames 26 are to be lifted, they are moved by one feed pitch. Subsequently, the elevator frames 26 are moved to the initial positions after they are lowered with the carrier bars 16 received by the carrier bar insulators 17. This modified construction permits the elevator frames 26 to be directly driven independently and to be moved together with the lifting gear means 27.

Since each slide block 28 is provided with arrangement pitch changing means 34 in the foregoing embodiment, a suitable arrangement pitch of the materials 15 in accordance with treatment types may be ensured. However, even if the arrangement pitch changing means are not provided, the intended object may be achieved. Each arrangement pitch changing means 34 may not have a construction that the bar support 29 urged by the spring is pulled by the flexible wires 35. A hydraulic drive system, cam drive system, or screw shaft system may be employed for the arrangment pitch changing means 34. Furthermore, the arrangement pitch changing means 34 may not be provided on the slide blocks 28. They may be mounted on the outer side of each elevator frame 26. Furthermore, the travelling rails may not be disposed over the treating tubs. They may be disposed at either side of the treating tubs or beneath them. Thus, the present invention should not be limited by the above-described embodiments. The apparatus in accordance with this invention may be applied to the conveying of workpieces in alumite treatment or electrostatic coating.

As described above, the apparatus of the first to third embodiments are characterized in that the movement zones of the unit and collective conveyor means 25 and 33 are overlapped in part. Consequently, the conveyance efficiency may be improved and the treating steps may be combined with one another with ease. Furthermore, the treatment line 1 may be shortened.

Figure 18A:
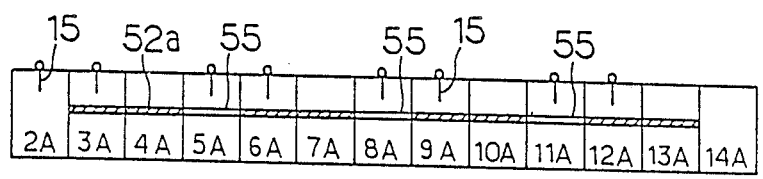
FIGS. 18(a) to 18(e) represent a schematic illustration of an untreated material conveying process of the collective conveyor means in another operation cycle.
Figure 18B:
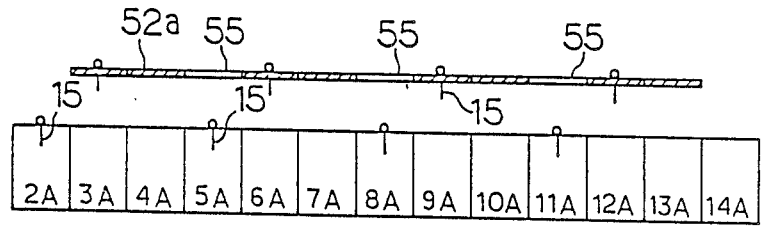
Figure 18C:
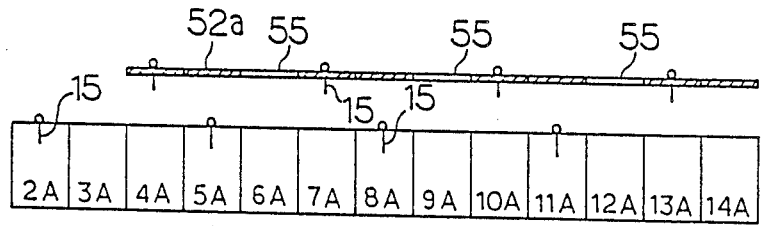
Figure 18D:
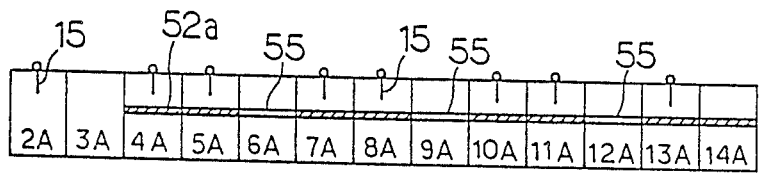
Figure 18E:
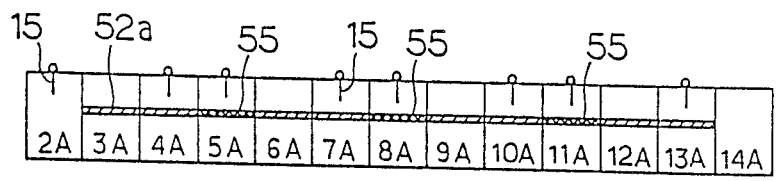
Figures 19, 20:
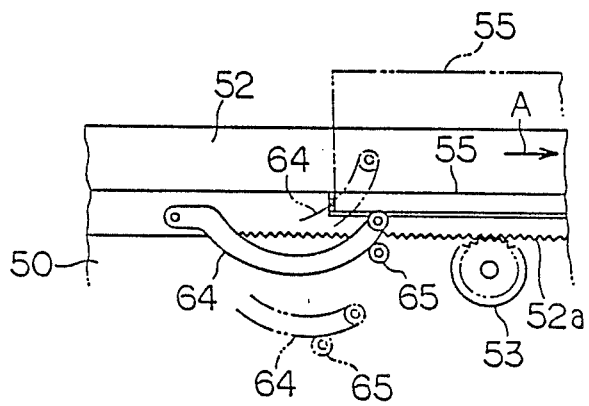
FIG. 19 illustrates treating steps of the treatment line.
FIG. 20 is a view similar to FIG. 15 showing a modified form of the changeover means employed in the apparatus of a fifth embodiment.

A fourth embodiment will now be described with reference to FIGS. 10-19. Same parts as shown in FIGS. 1-6 are labelled by the identical numerals, and differences of the construction from those shown in FIGS. 1-6 will be described. FIG. 19 illustrates an arrangement of the treating steps for which the apparatus of the fourth embodiment is employed. The movable area of the unit conveyor means 25, that is, the area in which the travelling rails 18 are extended in the treatment line 1 covers a whole area of the treatment line 1. However, in the embodiment, the actual movement zone of the unit conveyor means 25 covers a section from the loading position to the water washing tub 3A through the electrolytic degreasing tub 2A.

Figure 10:
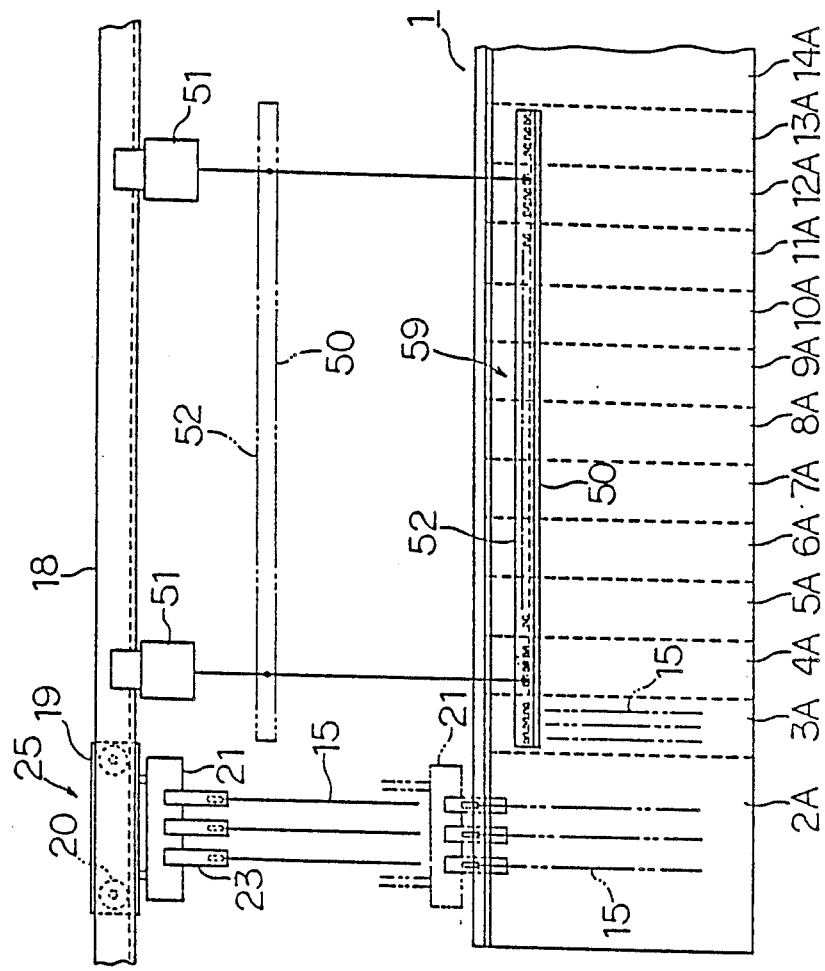
FIG. 10 is a partial side view of the treatment line employed in the fourth embodiment of the invention.
Figure 12:
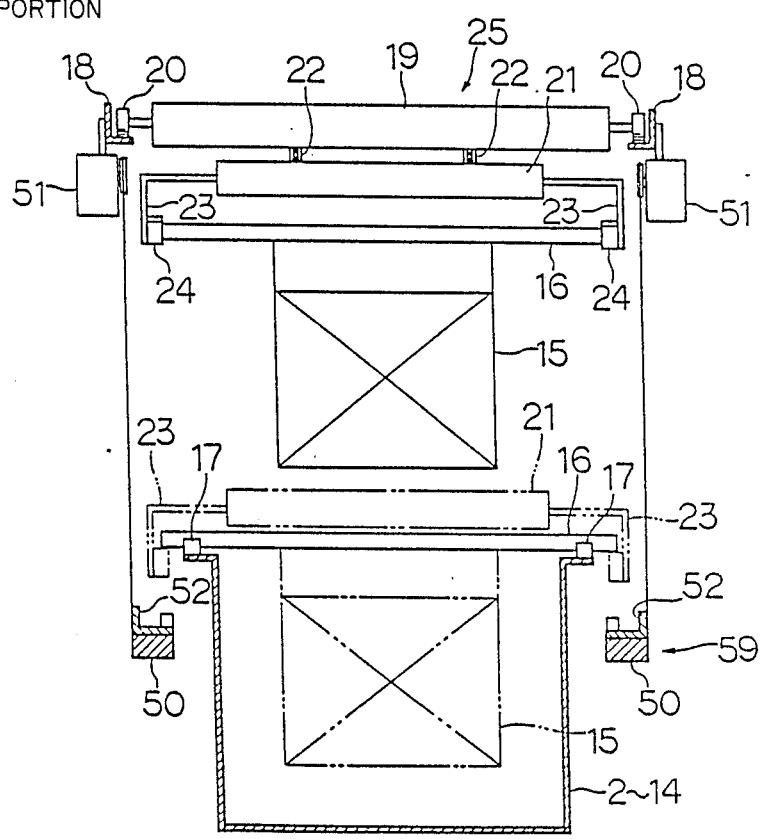
FIG. 12 is a longitudinal section of the treatment line.

Referring now to FIGS. 10 and 12, the elevator frames 50 are provided at both sides of the treating tubs 3A-13A outside the carrier bar insulators 17, respectively. The elevator frames 50 are lifted and lowered between the lower limit position shown by solid line in FIG. 10 and the upper limit position shown by alternate long and two short dashed line by lifting gear means 25 (not shown) provided over the treatment line 1.

Figure 11:
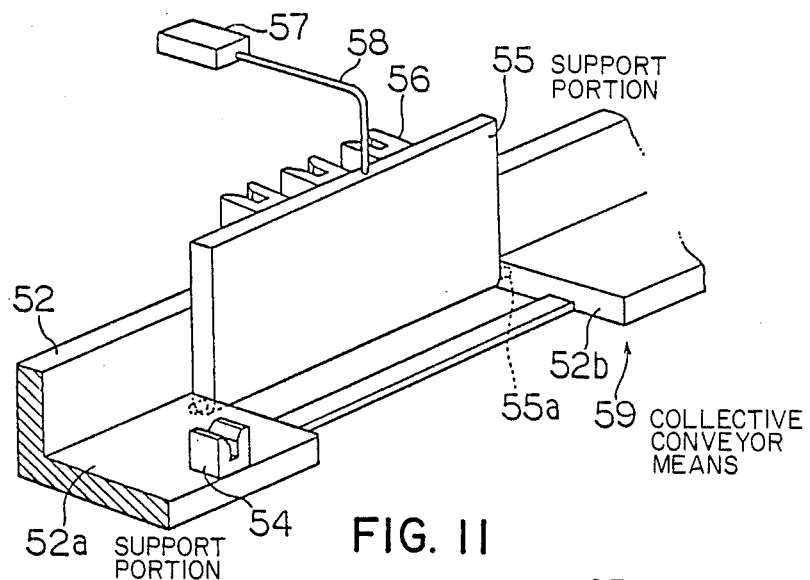
FIG. 11 is an enlarged perspective view of a movable plate.
Figure 13:
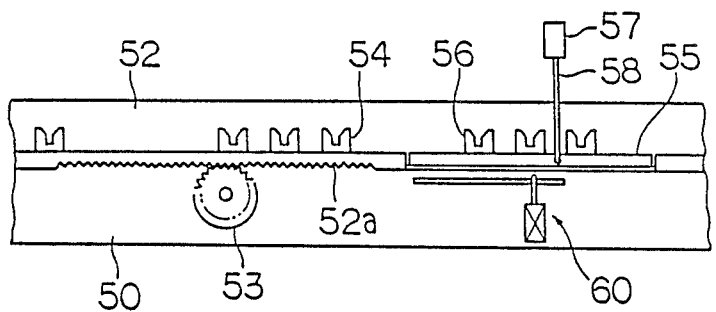
FIG. 13 is a partial enlarged side view of the collective conveyor means.

A slide bar 52 is provided so as to be movable along the elevator frames 50 and has approximately the same length as each elevator frame 50. As shown in FIG. 13, a rack 52c is formed on the underside of the slide bar 52, and a pinion 53 is provided so as to be in mesh engagement with the rack 52c. The pinion 53 is rotatably driven by a drive means (not shown). Rotation of the pinion 53 causes the slide bar 52 to reciprocally move along the elevator frames 50. As shown in FIG. 11, the slide bar 52 has a generally L-shaped cross section. A plurality of groups of bar supports 54, each group comprising, for example, three bar supports, are provided on the upper face of the horizontal portion 52a of the slide bar 52, which portion serves to support the carrier bars 16. See FIG. 13. The bar supports 54 of each group are so positioned as to correspond to the water washing tubs 3A, 4A, 6A, 7A, water spray washing tubs 9A, 10A, and the water washing tubs 12A, 13A. Parts of the horizontal portion of the slide bar 52 corresponding to the acid pickling tub 5A, soft etching tub 8A, and acid pickling tub 11A respectively have been cut out to thereby form cutout portions 52b. A movable plate 55 as a support section is provided in each cutout portion 52b and mounted on hinges 55a so as to be rotatably movable between the horizontal position shown by solid line in FIG. 14 and the vertical position shown by alternate long and two short dashes line. Three bar supports 56 same as the bar supports 54 are provided on the upper face of each movable plate 55. A generally L-shaped arm 58 having a weight 57 at the distal end projects from the end of the movable plate 55 opposed to the hinge 55a. The collective conveyor means 59 thus comprises the elevator frames 50, lifting gear means 51, side bars 52, rack 52c, pinion 53, and their relative mechanism. In the condition that each movable plate 55 is set at the horizontal position, when the elevator frames 50 are lifted from the lower limit position, both ends of all the carrier bars 16 placed in the area where the slide bar 52 is disposed, that is, placed in the treating tubs 3A-13A are hooked by the horizontal portions 52a of the slide bars 52 and bar supports 54 of the movable plates 55, thereby lifting the carrier bars 16 and hence, the materials 15 to be electroplated all together. On the other hand, when the elevator frames 50 are lifted with each movable plate 55 set at the vertical position, each movable plate 55 does not receive the carrier bars 16. Consequently, the carrier bars 16 placed in the acid pickling tub 5A, soft etching tub 8A, and acid pickling tub 11A are not hooked, while the carrier bars 16 placed in the water washing tubs are hooked by the bar supports 54 to be fed to the subsequent treating steps. Accordingly, the horizontal position of each movable plate 55 will be referred to as a support position at which the carrier bars 16 are supported, while the vertical position thereof will be referred to as a support evasion position at which the movable plates 55 do not receive the carrier bars 16, respectively.

Figure 14:
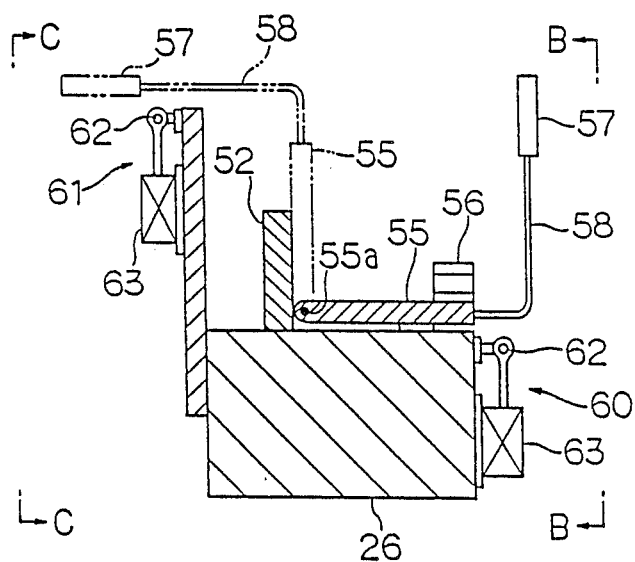
FIG. 14 is an enlarged longitudinal section of the movable plate.
Figure 15:
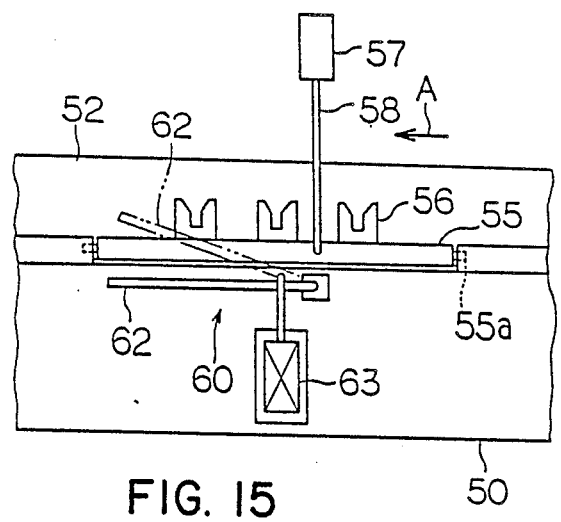
FIG. 15 is a side view of the movable plate as seen in the direction of line B—B in FIG. 14.
Figure 16:
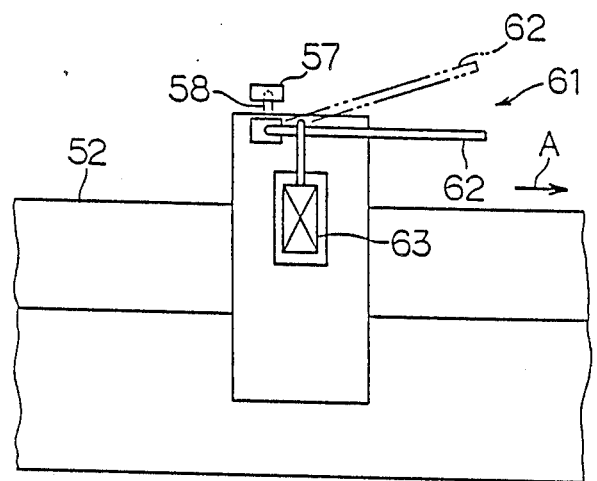
FIG. 16 is a side view of the movable plate as seen in the direction of line C—C in FIG. 14.

Referring now to FIG. 14, a changeover means 60 is provided at the inside of the elevator frame 50 for changing the movable plate 55 from the support position to the support evasion position. Another chnageover means 61 is provided at the outside of the elevator frames 50 for changing the elevator frames 50 from the support evasion position to the support position. The changeover means 60 and 61 have the same construction, as shown in FIGS. 15 and 16. Each of the changeover means 60, 61 comprises a guide bar 62 supported at one end for vertically rotatable movement and a solenoid 63 for rotatably moving the guide bar 62 between the horizontal position thereof and the upwardly inclined position thereof as seen from the direction in which the slide bar 52 returns after feeding the carrier bars 16 to the subsequent treating steps (that is, in the direction of arrow A). When the guide bar 62 of the changeover means 60 is moved to be inclined with each movable plate 55 occupying the support position, an arm 58 is moved in the direction of arrow A with the horizontal portion thereof sliding on the guide bar 62, when the slide bar 52 slides in the direction of arrow A. See FIG. 16. Consequently, each movable plate 55 is moved upwardly and then moved to the support evasion position (shown by alternate long and two short dashes line in FIG. 14) automatically owing to the weight 57. When the guide bar 62 of the changeover means 61 is moved to be inclined with each movable plate 55 occupying the support evasion position, the arm 58 is moved in the direction of arrow A with the horizontal portion thereof sliding on the guide bar 62 when the slide bar 52 slides in the direction arrow A. Consequently, each movable plate 55 is moved downwardly and then, further moved to the support position automatically owing to the weight 57.

Operation of the apparatus of the fourth embodiment will now be described with reference to FIGS. 17(a) to 17(e) and 18(a) to 18(e Crossed oblique lines in FIGS. 17(a) to 17(e) and 18(a) to 18(b) indicate the movable plate 55 occupying the support position and a blank the movable plate 55 occupying the support evasion position. As shown in FIG. 19, the materials 15 are required to be immersed for 30 seconds, for example, in each of the electrolytic degreasing tub 2A, acid pickling tub 5A, soft etching tub 8A, and acid pickling tub 11A. On the other hand, the materials 15 are required to be immersed for only 15 seconds in each of the water washing tubs 3A, 4A, 6A, 7A, 12A, 13A, and the water spray washing tubs 9A, 10A.

Figure 17A:
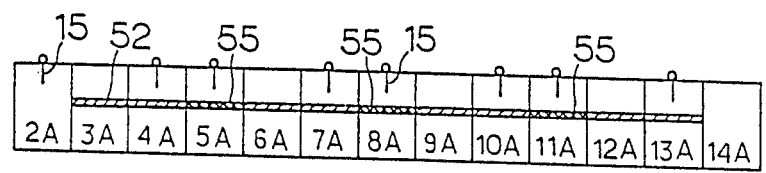
FIGS. 17(a) to 17(e) represent a schematic illustration of an untreated material conveying process of the collective conveyor means in its one operation cycle.
Figure 17B:
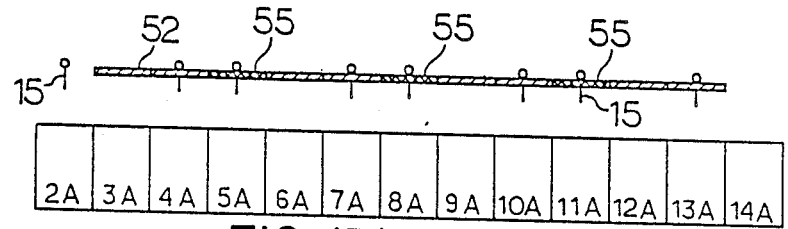
Figure 17C:
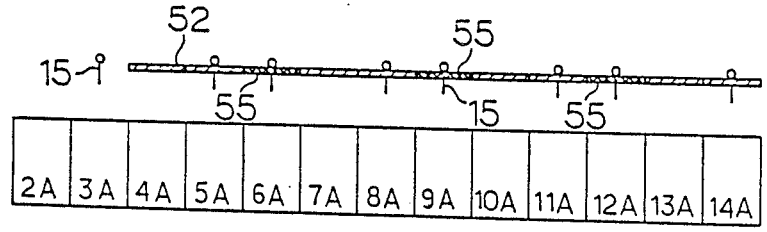
Figure 17D:
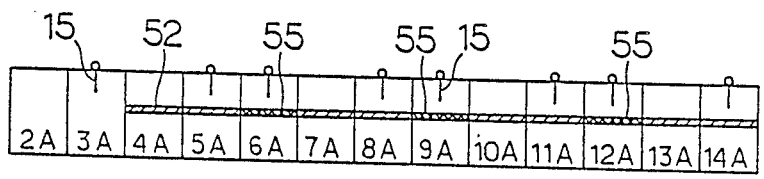
Figure 17E:
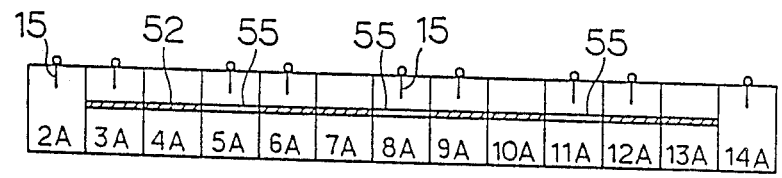

As shown in FIG. 17(a), the materials 15 hung on the unit conveyor means 25 are placed in the electrolytic degreasing tub 2A. The materials 15 are further placed in the water washing tub 4A, acid pickling tub 5A, water washing tub 7A, soft etching tub 8A, water spray washing tub 10A, acid pickling tub 11A, and water washing tub 13A. Each movable plate 55 is set at the support position. In this state of condition, when the elevator frames 55 are lifted from the lower limit position, both ends of all the carrier bars 16 placed in the water washing tubs 4A, 7A, 13A, acid pickling tubs 5A, 11A, soft etching tub 8A, and water spray washing tub 10A are hooked by the respective bar supports 54 and 56, thereby lifting the carrier bars 16 and hence the materials 15 all together, as shown in FIG. 17(b). Subsequently, when the elevator frames 50 reach the upper limit position, the pinion 53 is rotatably driven in one direction, whereby the slide bars 52 and hence the materials 15 are fed to the subsequent treating step sections, as shown in FIG. 17(c). When the elevator frames 50 are lowered to the lower limit position, the carrier bars 16 are received by the carrier bar insulators 17. As shown in FIG. 17(d), the materials 15 are placed in the treating tubs 5A, 6A, 8A, 9A, 11A, 12A and electroplating tub 14A. Then, reverse rotatable movement of the pinion 53 allows the slide bar 52 to return to the initial position. In this case, since the solenoid of the changeover means 60 is activated to set the guide bar 62 at the inclined position shown by alternate long and two short dashes line in FIG. 15, the movable plate 55 is moved from the support position to the support evasion position in response to return movement of the slide bar 52, as shown in FIG. 17(e). The above-described movement of the collective conveyor means 59 will be referred to as a primary movement cycle. In the primary movement cycle, the materials 15 hung on the unit conveyor means 25 are conveyed from the electrolytic degreasing tub 2A to the water washing tub 3A. Subsequently, the unit conveyor means 25 is caused to return to the load position to immerse newly loaded materials 15 in the electrolytic degreasing tub 2A. The materials 15 conveyed to the electroplating tub 14A are conveyed by another conveyor (not shown) in turn.

When 15 seconds elapse after the materials 15 are placed in the treating tubs 5A, 6A, 8A, 9A, 11A, and 12A, the elevator frames 50 are lifted from the lower limit position in the same manner as described above, as shown in FIGS. 18(a) and 18(b). Since each movable plate 55 is then set at the support evasion position, the carrier bars 16 placed in the acid pickling tubs 5A, 11A and soft etching tub 8A are not hooked, while the carrier bars 16 placed in the water washing tubs 3A, 6A, water spray washing tub 9A, water washing tub 12A are hooked by the respective bar supports 54, thereby lifting these carrier bars 16 and hence the materials 15 all together. Then, when the elevator frames 50 are lifted to the upper limit position, the pinion 53 is rotatably driven in one direction. As a result, the slide bars 52 and hence the materials 15 are fed to the subsequent treating step sections, as shown in FIG. 18(c), and the elevator frames 50 are again lowered to the lower limit position so that the carrier bars 16 are received by the carrier bar insulators 17, thereby placing the materials 15 in the water washing tubs 4A, 7A, water spray washing tub 10A, and water washing tub 13A, as shown in FIG 18(d). Subsequently, reverse rotatable movement of the pinion 53 allows each slide bar 52 to return to the initial position. Since the guide bars 62 of the changeover means 61 is set by the solenoid 53 to the inclined position shown by alternate long and two short dashes line in FIG. 16, each movable plate 55 is moved from the support evasion position to the support position in response to the return movement of the slide bar 52, as shown in FIG. 18(e). The above-described movement of the collective conveyor means 59 will be referred to as a secondary movement cycle. The state of conditition before starting the primary movement cycle is thus revived and after the materials 15 are placed in the acid pickling tub 5A, soft etching tub 8A, and acid pickling tub 11A for 30 seconds, the primary movement cycle is executed. Then, the secondary and primary movement cycles are reiteratively executed to perform treatment of the materials 15.

According to the fourth embodiment, by setting each movable plate 55 at the support position, the materials 15 placed in the acid pickling tub 5A. soft etching tub 8A, and acid pickling tub 11A may be conveyed to the subsequent treating step sections together with the materials 15 placed in the water washing tubs 4A, 7A, water spray washing tub 10A, and water washing tub 13A. Further, by setting each movable plate 55 at the support evasion position, only the materials 15 placed in the water washing tubs 3A, 6A, water spray washing tub 9A, and water washing tub 12A may be conveyed to the subsequent treating step sections. The water washing treatment at each of the tubs 3A, 4A, 6A, 7A, 9A, 10A, 12A, and 13A does not usually require a long period of time. The above-described construction permits the treatment period of time at the water washing tubs to be reduced to the value approximately half as much as that at each of the electrolytic degreasing tub 2A, acid pickling tub 5A, soft etching tub 8A, and acid pickling tub 11A. Accordingly, although the water washing treatment includes eight steps, these steps may be completed for the period of time conveniently required for four steps of water washing treatment, thereby shortening the treatment period of time as a whole. In the actual electroplating treatment line, the electroplated materials necessitates to be further treated through many water washing steps before being produced as final products. However, the treatment period of time may relatively be shortened with increase of the water washing steps, thereby improving the treating efficiency.

The chnageover means for rotatably moving each movable plate 55 between the support and support evasion positions is not limited to the above-described construction. For example, a shaft may be employed for supporting each movable plate 55 instead of the hinges, and the shaft may be forward and reverse rotated by an electric motor so that the movable plates 55 are moved to the support or support evasion position all together. Alternatively, a shaft may be provided in the vicinity of the movable plates 55 and connected to each movable plate 55 through a connecting member so that the forward and reverse rotation of the shaft by the motor causes the connecting member to push and draw the movable plates 55, thereby rotatably moving the same to the support or support evasion position. Furthermore, a pneumatic cylinder or the like may be employed for pushing and drawing the movable plates 55. Furthermore, as shown in FIG. 20 as a fifth embodiment, an arc-shaped actuating member 64 is rotatably mounted on the slide bar 52. The actuating member 64 is provided so that the distal end thereof is brought into contact with and departs from the under face of each movable plate 55. Further, each elevator frame 50 is provided with a support pin 65 which changes its position between upper and lower positions at every one cycle of the slide bar 52. In this construction, when the support pin 65 occupies the upper position shown by solid line in FIG. 20, the actuating member 64 is moved in the direction of arrow A, sliding against the support pin 65 when the slide bar 52 returns to its initial position, whereby the actuating member 64 engages the movable plate 55, which is rotatably moved from the support position to the support evasion position shown by alternate long and two short dashes line. Subsequently, when the operation cycle of of the slide bar 52 moves the support pin 65 to the lower position shown by alternate long and two short dashes line, the actuating member 64 is rotatably moved downwardly, departing from each movable plate 55, which then returns to the support position owing to its weight.

According to the fourth and fifth embodiments, the support portions of the collective conveyor means 33 corresponding to the treatment sections except the water washing sections are reciprocally movable between the support position at which the materials are supported and the support evasion position at which support of the materials is evaded. As a result, the materials at each treatment section may be conveyed all togehter and the materials only at the water washing sections may be conveyed at every one operation cycle of the collective conveyor means. Consequently, the period of time for the water washing treatment usually requirIng not so long a period may be shortened as compared with the time period required at the other treatment sections, thereby shortening the whole treatment period of time and improving the treating efficiency.

What is claimed is:

1. An apparatus for conveying untreated materials, comprising:
  (a) a unit conveyor means (25) movably provided along a treatment line (1) including a plurality of treating sections arranged in a row, said unit conveyor means (25) being moved from one of the treating sections to another which may not be consecutive so that a unit of untreated materials (15) is lifted and lowered from and into the treating section; and
  (b) a collective conveyor means (33) movable separate from said unit conveyor means along the treatment line (1), said collective conveyor means (33) being moved so that the untreated materials (15) located at a plurality of treating sections are collectively lifted and lowered from and into said plurality of treating sections to be conveyed to a plurality of subsequent treating sections, said collectively conveyor means (33) having a zone of movement thereof overlapped with a zone of movement of said unit conveyor means (25) over a plurality of treating sections along said treating lines (1).

2. An apparatus for conveying untreated materials, as claimed in claim 1, wherein a feed pitch at which the untreated materials (15) are conveyed by said collective conveyor means (33) along the treatment line (1) is varied in accordance with treatment contents performed in the treating sections.

3. An apparatus for conveying untreated materials, as claimed in claim 1, wherein said collective conveyor means (33) is provided with arrangement pitch changing means (34) for changing an arrangement pitch of the untreated materials (15).

4. An apparatus for conveying untreated materials, as claimed in claim 1, wherein said unit conveyor means (25) comprises a carriage (19) operated to move along the treatment line (1) and carrier members (16) provided on said carriage (19) so as to be vertically moved so that the untreated materials (15) are lifted and lowered.

5. An apparatus for conveying untreated materials, as claimed in claim 1, wherein said collective conveyor means (33) comprises frames (26) provided along the treatment line (1) over a plurality of treating sections, lifting gear means (27) for vertically lifting said frames (26). and support members (28) provided on said frames (26) so as to be moved along the treatment line (1). each said support member (28) supporting the untreated materials (15).

* * * * *